United States Patent [19]

Nakazawa et al.

[11] Patent Number: 5,398,725
[45] Date of Patent: Mar. 21, 1995

[54] FLOW CONTROL DEVICE

[75] Inventors: Masahiko Nakazawa; Kazuo Tsukada, both of Osaka, Japan

[73] Assignee: Fujikin Incorporated, Osaka, Japan

[21] Appl. No.: 148,434

[22] Filed: Nov. 8, 1993

[30] Foreign Application Priority Data

| Nov. 6, 1992 | [JP] | Japan | 4-297298 |
| Nov. 6, 1992 | [JP] | Japan | 4-297299 |

[51] Int. Cl.⁶ .................... F16K 31/524; F16K 11/16
[52] U.S. Cl. ....................... 137/636.1; 137/636.2; 251/263; 251/331; 251/335.3
[58] Field of Search ............ 137/636, 636.1, 636.2; 251/252, 263, 331, 335.2, 335.3; 74/55, 56, 57, 471 R, 471 XY, 567

[56] References Cited

U.S. PATENT DOCUMENTS

| 780,929 | 1/1905 | Angehr | 251/263 |
| 1,069,876 | 8/1913 | Houser | 251/263 |
| 1,095,003 | 4/1914 | Leonard | 137/636.2 |
| 1,672,235 | 6/1928 | Taylor | 251/263 |
| 1,705,139 | 3/1929 | Rigal | 251/263 |
| 1,840,961 | 1/1932 | Kuenzler | 137/636.1 |
| 2,857,930 | 10/1958 | Dombre | 137/636.2 |
| 2,934,091 | 4/1960 | Chapon | 137/636.1 |
| 3,127,786 | 4/1964 | Wooley | 251/263 |
| 3,260,131 | 7/1966 | Miles | |
| 3,369,566 | 2/1968 | Schmitt et al. | 137/636.2 |
| 3,548,878 | 4/1969 | Brigandi | 251/331 |
| 4,343,456 | 8/1982 | Zitzloff | 251/335.2 |
| 4,505,301 | 3/1985 | Yang | 137/636.2 |
| 4,804,164 | 2/1989 | Nakazawa et al. | 251/335.3 |
| 4,911,412 | 3/1990 | Danko | |
| 4,957,137 | 9/1990 | Wang | 137/636.1 |

FOREIGN PATENT DOCUMENTS

| 73/63120 | 12/1972 | Australia | |
| 538359 | 3/1957 | Canada | 137/636.1 |
| 987613 | 11/1948 | France | |
| 562477 | 10/1943 | United Kingdom | |

Primary Examiner—George L. Walton
Attorney, Agent, or Firm—Armstrong, Westerman, Hattori, McLeland & Naughton

[57] ABSTRACT

A flow control device has a case formed in a lower portion thereof with a fluid channel and a disk seat at an intermediate portion of the channel. A spindle housed in the case has a disk at its lower end and a rollable member at its upper end and is biased by a spring to press the disk against the seat. The case is provided in an upper portion thereof with a rotary shaft having an upwardly projecting handle or sidewise projecting lever handle. The shaft has a rollable member seat which is annular or circular-arc when seen from above and which is formed with a protuberance for lifting and lowering the rollable member as placed on its seat. Rotation of the shaft moves the protuberance, which in turn raises the rollable member to lift the spindle and hold the disk away from the disk seat. The rotation of the shaft reliably opens or closes the channel, or reliably effects a change-over between fluid channels. The seal face of the disk is less prone to abrasion or damage, will not displace the handle when the disk is thereby closed and is highly durable. The fluid channel within the device can be completely sealed off, so that the device is advantageously usable as a sanitary valve.

7 Claims, 8 Drawing Sheets

FLOW CONTROL DEVICE

BACKGROUND OF THE INVENTION

The present invention relates to flow control valves.

Conventional flow control devices comprise, for example, a spindle having a handle at its upper end, a disk and an externally threaded portion in screw-thread engagement with an internally threaded portion of a case having a disk seat therein. The disk is pressed against the seat or moved away therefrom by rotating the handle to close or open a fluid channel extending through the case. On the other hand, so-called rotary valves are known as change-over valves or directional control valves. Such valves comprise a valve element having many fluid channels and rotatable so as to cause the desired one of the channels to communicate with an opening portion of the valve casing to effect change-over between flows.

However, the conventional flow control device described has the problem that the seal face of the disk becomes indented during long use, displacing the handle when the disk is closed, or that the disk closing position changes owing to a machining error involved in the fabrication of the device, consequently influencing the opening-closing operation of the device. It is likely that the operator will tighten up the handle excessively to produce an indentation in or cause damage to the seal face of the disk, thereby aggravating the above problem. With the conventional rotary valve as a change-over valve, it is not easy to make the valve element which has many fluid channels. Further use of the valve as a sanitary valve involves the problem that it is difficult to completely seal the fluid channels in the valve.

SUMMARY OF THE INVENTION

The main object of the present invention is to provide a flow control device which is free of the foregoing problem.

The present invention provides a flow control device which comprises a case formed in a lower portion thereof with a plurality of branch fluid channels for a single main fluid channel and with a disk seat at an intermediate portion of each of the branch fluid channels, a plurality of spindles housed in the case and each provided at a lower end thereof with a disk corresponding to the disk seat, each of the spindles being biased by a spring to press the disk against the disk seat, a rollable member attached to an upper end portion of each of the spindles for lifting and lowering the spindle, and a rotary shaft having a handle and mounted on the case, the rotary shaft being provided with an annular seat for the rollable member, a rollable member lifting protuberance projecting upward from an upper surface of the annular seat at a side portion thereof, the protuberance being formed in its top with a recess for the rollable member to partially fit in and having a slanting guide face on each of opposite sides of the recess, the rollable member being disposed on the upper surface of the annular seat, the protuberance of the annular seat being movable by rotating the rotary shaft to lift desired one of the rollable members on the annular seat by the protuberance and to partially fit the lifted rollable member into the top recess of the protuberance, whereby the spindle is lifted to hold the disk away from the corresponding disk seat and to permit the branch fluid channel having the corresponding disk seat to communicate with the main fluid channel.

With the flow control device of the present invention, the disk on the spindle is pressed against the disk seat always under a constant pressure by the force of the spring. The fluid channel can therefore be opened and closed reliably. Moreover, the seal face of the disk is consequently made less prone to abrasion or damage, will not permit displacement of the handle during long use when the disk is thereby closed and is highly durable.

When the annular rollable member seat provided on the rotary shaft having the handle carries thereon rollable members which are equal in number to the number of spindles, the plurality of branch channels can be opened one after another for communication with the main fluid channel every time the handle and the rotary shaft are rotated through a predetermined angle, for example, through 90 deg. This assures a change-over between the fluid channels with extreme ease. Since there is no need to use a valve element having many fluid channels and cumbersome to make like the one used in the conventional rotary valve, the present device is easy to manufacture.

In the flow control device described, a diaphragm is interposed between the disk at the lower end of each spindle and the disk seat, and the spindle has a coiled spring fitted therearound and biasing the disk against the disk seat with the diaphragm positioned therebetween.

According to another embodiment of the invention, the spindle housed in the case comprises an upper spindle member and a lower spindle member rotatably connected to a lower end thereof and provided with the disk at its lower end, the upper spindle member being biased downward by a coiled spring fitted therearound, the lower spindle member having a bellows-shaped seal tube fitted therearound, the seal tube having upper and lower opposite ends fixed respectively to a ring and an annular projecting portion, the ring fixedly resting on an annular stepped portion formed inside the case and positioned below the upper spindle member, the annular projecting portion being formed on the lower spindle member close to its lower end.

Thus, the diaphragm is disposed above the disk seat provided at an intermediate portion of the fluid channel in the case, or the spindle member having the disk is covered with the bellows-shaped seal tube, whereby the fluid channel can be completely sealed. The flow control device can therefore be used advantageously as a sanitary valve.

According to another embodiment, the case has a single fluid channel in its lower portion, and a disk seat is provided at an intermediate portion of the fluid channel. The case houses a spindle having at its lower end a disk corresponding to the disk seat and at its upper end a rollable member for lifting and lowering the spindle. The case is provided with a rotary shaft having a handle and a rollable member seat which is shaped in a circular-arc form when seen from above, a rollable member lifting protuberance projecting upward from an upper surface of the rollable member seat and having in its top a recess for the rollable member to partially fit in and a slanting guide face on each of opposite sides of the recess.

The rotary shaft is housed in the case, and the handle is a lever handle attached to one side of an intermediate portion of length of the rotary shaft, the case being formed in a side portion thereof with a window for inserting the lever handle therethrough, the lever handle having an outer end portion projecting outward through the window, the circular-arc seat for the rollable member extending from the other side of the intermediate portion of the rotary shaft toward the spindle, the rollable member being disposed on the upper surface of its seat.

The present invention will be described in greater detail with reference to the accompanying drawings.

DESCRIPTION OF THE PREFERRED EMBODIMENTS

Throughout the drawings, like parts are designated by like reference numerals.

Figure 1:
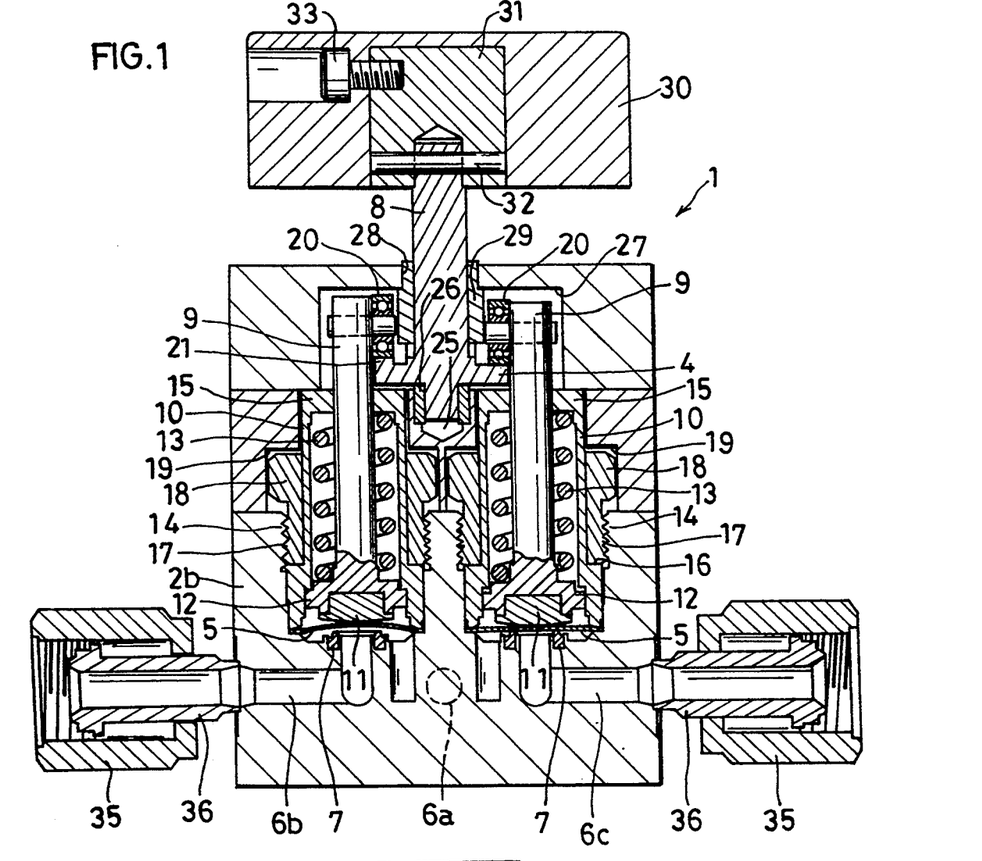
FIG. 1 is a view in vertical section of an embodiment 1 of the invention.

The terms "front," "rear," "right" and "left" are herein used based on FIG. 1; "front" refers to the front side of the plane of the drawing, "rear" to the rear side thereof, "right" to the right-hand side of the drawing, and "left" to the left-hand side thereof.

Embodiment 1

FIGS. 1 to 5 show an embodiment 1 of the invention, i.e., a flow control device 1, having a substantially rectangular parallelepipedal case 2 which is horizontally divided at the middle of its height and at a distance of ¼ of the height from its top, and comprises a lower portion, i.e., case body 2a, an upper portion, i.e., closure portion 2b and an intermediate case portion 2c between the two portions.

Formed in the case body 2a are a single main fluid channel 6a opened at the rear side of the body, and first and second branch fluid channels 6b, 6c provided for the main fluid channel 6a and opened at the left and right sides, respectively. The case body 2a further has cavities 3, 3 with which the respective branch channels 6b, 6c are in communication each at an intermediate portion thereof. A disk seat 7 is provided at the intermediate portion of each branch channel 6b (6c) at the bottom of the cavity 3. The cavity 3 has an opening peripheral portion which is internally threaded as at 14. A diaphragm 5 is disposed above the disk seat 7 in the bottom of each cavity 3.

A pair of right and left spindles 9, 9 are vertically disposed in the respective cavities 3, 3 of the case body 2a and each have a disk 11 at the lower end thereof. The disk 11 of the spindle 9 is opposed to the disk seat 7 from above the diaphragm 5. An annular spring retainer 12 is provided at the lower end of the spindle 9.

Inserted in each cavity 3 of the case body 2a is a spring accommodating tube 10 having a top wall 15 and fitting around the spindle 9 and the annular spring retainer 12. The tube 10 has a lower end holding the peripheral portion of the diaphragm 5 from above. Inside the tube 10, a coiled spring 13 fitting around the spindle 9 is provided between the tube top wall 15 and the spring retainer 12, biasing the spindle 9 downward to press the disk 11 at the spindle lower end against the disk seat 7 with the diaphragm 5 therebetween.

The spring accommodating tube 10 is externally provided with an annular stepped portion 16 close to its lower end. A holding tube 18 has an externally threaded lower end portion 17, which is screwed in the internally threaded opening portion 14 of the cavity 3, holding the stepped portion 16 of the tube 10 from above to fix the tube 10 in the cavity 3 of the case body 2a.

On the other hand, the intermediate case portion 2c has a pair of right and left through bores 19, 19 each having a small upper portion and an enlarged lower portion. The case portion 2c is disposed on the case body 2a so that the portion of the tube 10 and the portion of the holding tube 18 projecting upward from the body 2a fit in each bore 19.

Each spindle 9 has an upper end portion extending through the top wall 15 of the spring tube 10 and projecting upward beyond the intermediate case portion 2c. A rollable member 20 comprising a bearing is attached to the spindle 9 close to its upper end for lifting and lowering the spindle.

Figure 4:
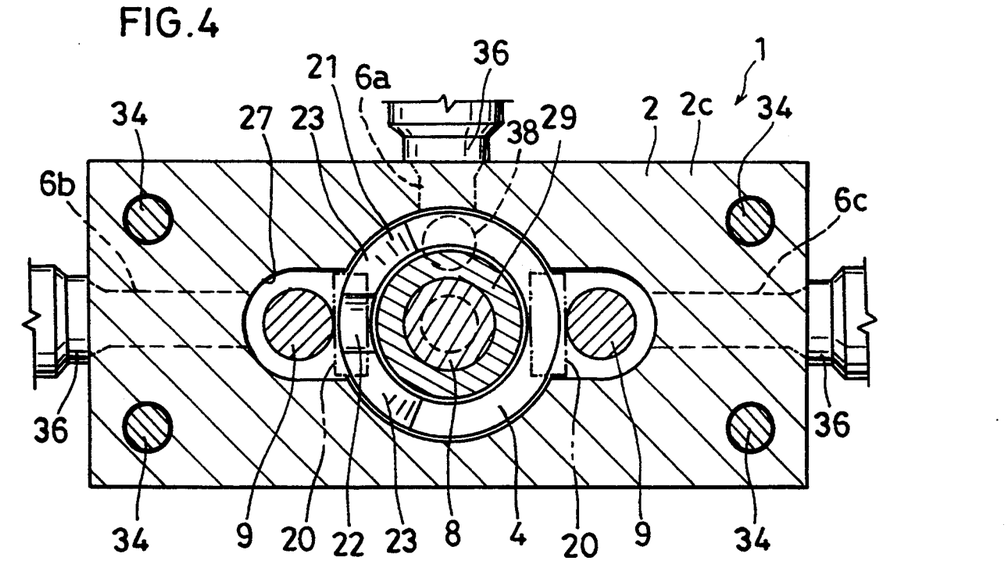
FIG. 4 is an enlarged fragmentary view in horizontal section of the embodiment 1, with a rotary shaft and rollable member shown in phantom lines.

The intermediate case portion 2c is centrally formed with a shaft bore 25 which is open at the upper surface of the case portion 2c and has a bearing sleeve 26 fitted therein. A rotary shaft 8 has a lower end 8a inserted in the sleeve 26 and is held upright by the top wall of the case portion 2c. The rotary shaft 8 has a portion close to its lower end and formed with an annular seat 4 for the rollable members 20. With reference to FIG. 1, the annular seat 4 has a rollable member lifting protuberance 21 projecting upward from the upper surface of left portion thereof. The protuberance 21 is formed in its top with a recess 22 for the rollable member 20 to partially fit in, and has slanting guide faces 23, 23 on opposite sides of the recess 22. The rollable members 20, 20 of the respective spindles 9, 9 rest on the seat 4 so as to be positioned on opposite sides of the shaft 8.

The intermediate case portion 2c has a stopper bore 37 formed in its upper surface and close to the front side thereof. A stopper 38 in the form of a ball and biased upward by a coiled spring 39 is accommodated in the bore 39. The rollable member seat 4 of the shaft 8 has two indentations 40 formed respectively in front and rear portions of its bottom for the stopper to partially fit in.

Figure 3:
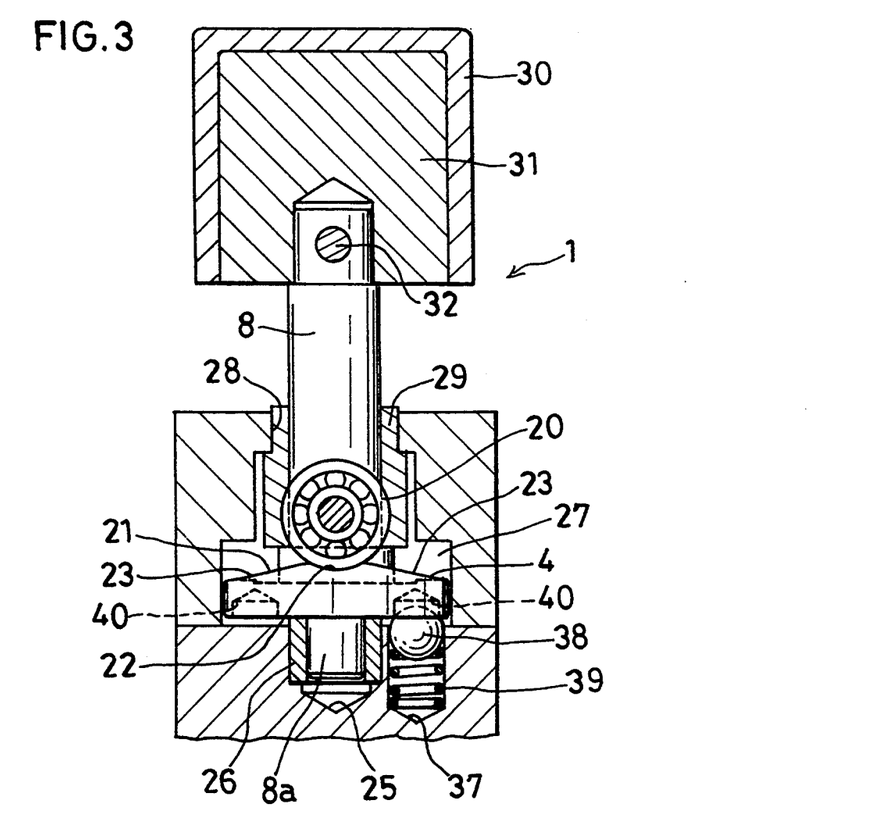
FIG. 3 is an enlarged fragmentary view in vertical section of the embodiment 1 to show a case closure portion.

The upper portion of the case 2, i.e., the closure 2b, has a cavity 27 formed in its bottom side and so sized as to accommodate the lower portion of the rotary shaft 8, rollable member seat 4, upper end portions of the two spindles 9 and rollable members 20 attached to the spindles. A shaft bore 28 communicating with the cavity 27 extends through the closure 2b centrally thereof and has a sleeve 29 fitted therein. The shaft 8 has an upper portion which alone projects upward beyond the closure 2b as disposed over the intermediate case portion 2c.

Figure 2:
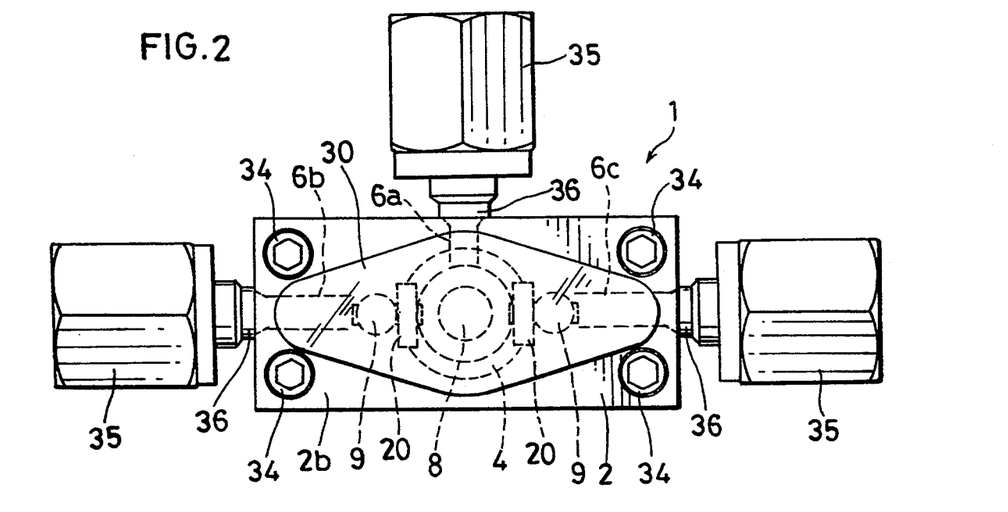
FIG. 2 is a plan view of the same.

A handle mount member 31 is fixed to the uppe end of the rotary shaft 8 by a pin 32. A handle 30, generally elliptical when seen from above, is fitted over the mount member 31 and fastened to the member 31 with a bolt 33 having a hexagonal recess.

The closure 2b, intermediate case portion 2c and case body 2a of the case 2 are joined together with screws 34 inserted through the four corners of these components. A short pipe 36 having a union nut 35 for piping connection is attached to each of the rear side wall and right and left side walls of the case body 2a.

Figure 5:
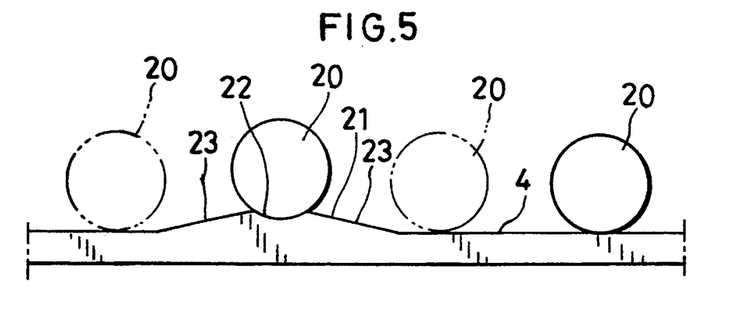
FIG. 5 is a side elevation in development of an annular rollable member seat of the rotary shaft.

When the first and second branch channels 6b, 6c of the flow control device 1 are held closed, the rollable members 20, 20 on the upper end portions of the pair of spindles 9, 9 are at rest on the seat 4 of the rotary shaft 8, as positioned on a flat portion on opposite sides of the protuberance 21 as shown in broken lines in FIG. 5.

When the handle 30 and the rotary shaft 8 connected thereto are then rotated through 90 deg, for example, clockwise, the protuberance 21 on one side of the seat 4 is moved, whereby one of the rollable members 20 on the seat 4 is raised along the slanting guide face 23 and partially fitted into the recess 22 in the top of the protuberance 21 as indicated in a solid line in FIG. 5. Consequently, the spindle 9 carrying this rollable member 20 is held lifted against the force of the spring 13 to hold the disk 11 at the lower end of the spindle 9 away from its seat 7 with the diaphragm 5 positioned therebetween and open the first branch channel 6b having the disk seat 7 for communication with the main fluid channel 6a. At this time, the upper portion of the ball-shaped stopper 38 which is biased upward by the spring 39 in the case portion 2c fits into the front indentation 40 in the bottom of the seat 4 to hold the shaft 8 and the handle 30 against rotation.

The rollable mbmer 20 on the upper end of the other spindle 9 is positioned on the flat portion of the seat 4 as shown in a solid line in FIG. 5, so that the disk 11 at the lower end of this spindle 9 remains pressed against the disk seat 7 of the second branch channel 6c with the diaphragm 5 positioned therebetween, holding the branch channel 6c closed out of communication with the main channel 6a.

The first branch channel 6b in this state is closed by rotating the rotary shaft 8 further through 90 deg clockwise. This moves the protuberance 21 of the seat 4, causing the rollable member 20 to move out of the recess 22 and descend the slanting guide face 23 and consequently permitting the spring 13 to lower the spindle 9 with its force to press the disk 11 at the spindle lower end against the disk seat 7 through the diaphragm 5 and bring the first branch channel 6b out of communication with the main channel 6a. The above movement releases the stopper 38 from the indentation 40 in the bottom of the seat 4 to free the stopper 38. However, since the rollable member 20 of one of the spindles 9 needs to be pushed up by the protuberance 21 for the rotation of the rotary shaft 8, there is no likelihood that the rotary shaft 8 will rotate inadvertently. The second branch channel 6c still remains out of communication with the main channel 6a.

When the shaft 8 in this state is further rotated clockwise through 90 deg, the protuberance 21 of the seat 4 moves, whereby the other rollable member 20 on the seat 4 is caused to ascend the slanting guide face 23 of the protuberance 21 and fit into the recess 22 in the top thereof. At the same time, the upper portion of the stopper 38 on the case portion 2c fits into the other indentation 40 in the seat 4. The second branch fluid channel 6c is now opened for communication with the main fluid channel 6a, while the first branch channel 6b is held closed out of communication with the main channel 6a.

When the handle 30 in this state is further rotated clockwise through 90 deg, the second branch channel 6c is closed with the first branch channel 6b remaining closed.

With the present embodiment, the first and second branch channels 6b, 6c can thus successively be opened and closed for the main channel 6a every time the handle 30 is rotated through 90 deg. The flow control device 1 is therefore adapted to effect a change-over between the fluid channels with extreme ease reliably.

Moreover, when the device 1 is manipulated for closing, the branch channels 6b, 6c are closed by the elastic force of the spring 13 instead of tightening up a screw conventionally used, so that no excessive force will act on the disk 11 or the seal face of the disk seat 11. This greatly diminishes abrasion of the seal face, while the handle 30 is unlikely to become displaced when closing the disk owing to an indentation of the seal face due to abrasion or owing to a manufacturing error.

Further especially with the embodiment 1, the rollable member 20 comprises a bearing and is therefore less susceptible to abrasion and usable for a prolonged period. Since the branch channels 6b, 6c are opened by turning the handle 30 in a direction to compress the spring 13, the torque required of the handle 30 is greater in the opening direction. This obviates damage to the diaphragm 5 disposed above the disk seat 7.

The diaphrams 5, 5 provided above the respective disk seats 7, 7 of the branch channels 6b, 6c within the case 2 completely seal the channels 6b, 6c. Accordingly, the flow control device 1 is advantageously usable also as a sanitary valve.

With the above embodiment, the rollable member 20, although comprising a ball bearing, may comprise other roller.

While the two branch fluid channels 6b, 6c are provided for the single main fluid channel 6a according to the above embodiment, at least three branch fluid channels may of course be provided. In this case, the case 2 has housed therein at least three spindles 9 each having at its lower end a disk 11 corresponding to the disk seat 7 provided in each of the branch channel.

Incidentally, in the case where the flow control device 1 is not used as a sanitary valve, the disk 11 of the spindle is adapted to be pressed into direct contact with the disk seat 7 without the intervening diaphragm 5.

Embodiment 2

Figure 6:
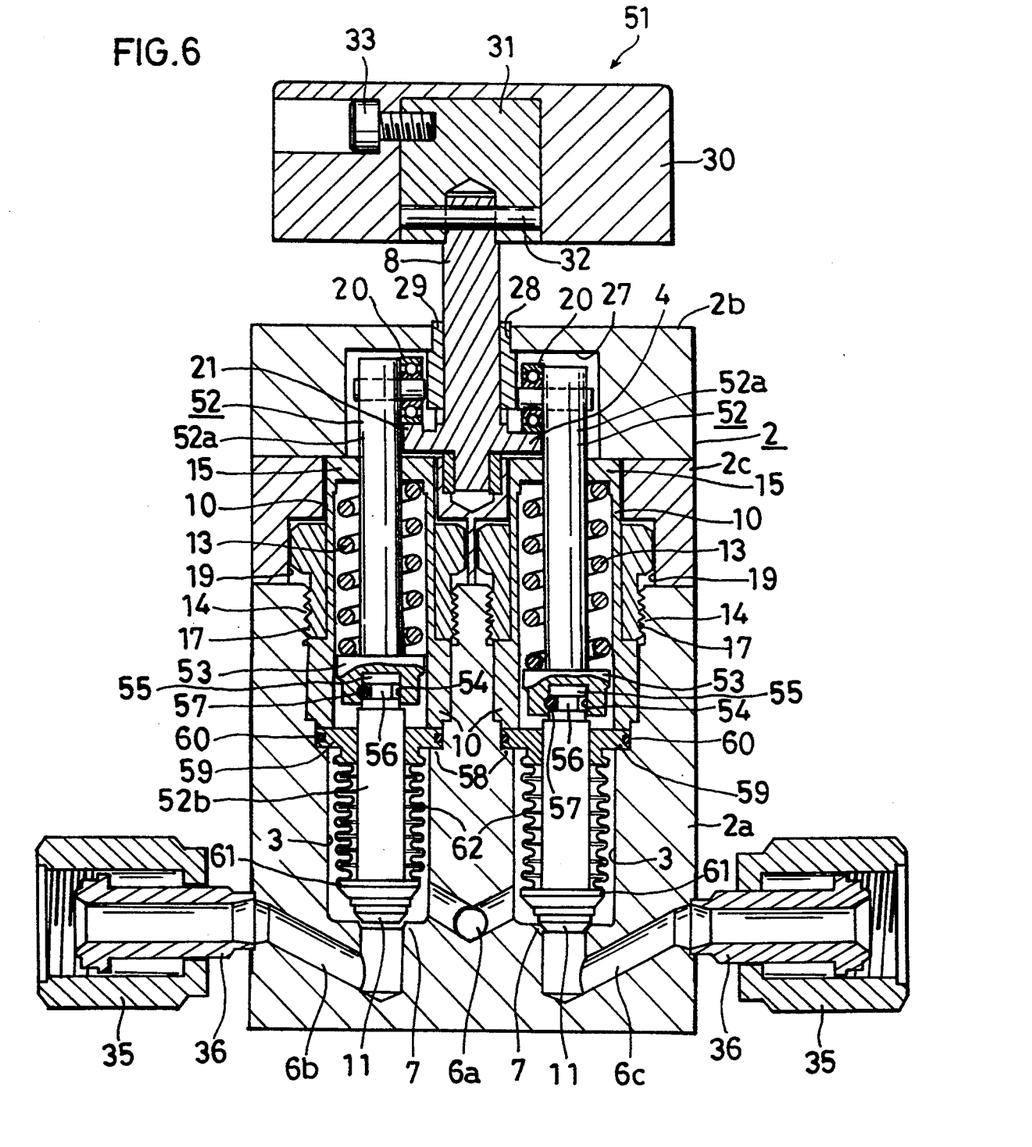
FIG. 6 is a view in vertical section of an embodiment 2 of the invention.

FIG. 6 shows this embodiment, which has nearly the same construction as the flow control device of embodiment 1 but differs therefrom in that the case 2 of the embodiment 2, i.e., flow control device 51, comprises a case body 2a formed as its lower portion and considerably elongated vertically. Accordingly, cavities 3 of large depth are formed in the case body 2a. Unlike the embodiment 1, no diaphragm is provided above the disk seat 7 at the bottom of each cavity 3.

Vertically disposed in each cavity 3 is a spindle 52 which comprises an upper spindle member 52a and a lower spindle member 52b rotatably connected to the lower end of the member 52a and provided with a disk 11 at its lower end. The upper spindle member 52a has an annular spring retainer 53 at its lower end. The spring retainer 53 is formed in the bottom side thereof with a downwardly open insertion recess 54. The lower spindle member 52b has a head 55 inserted in the recess 54 and formed with an annular groove 56. A horizontal connecting pin 57 is partly fitted in the groove 56 and has its opposite ends attached to the spring retainer 53, whereby the lower spindle member 52b is connected to the upper spindle member 52a rotatably relative thereto.

The cavity 3 of the case body 2a is internally provided at the middle of its height with an annular stepped portion 58, to which a ring 59 is fitted with a gasket 60 interposed therebetween. A spring accommodating tube 10 having a top wall 15 is disposed in the cavity 3 above the ring 59. The peripheral edge portion of the ring 59 is held from above by the lower end of the tube 10. Inside the tube 10, a coiled spring 13 fitted around the upper spindle member 52a is provided between the top wall 15 of the tube and the spring retainer 53. The spring 13 biases the spindle 52 downward, pressing the disk 11 at the spindle lower end into contact with the disk seat 7.

The lower spindle member 52b has an annular projecting portion 61 close to its lower end. A bellows-shaped seal tube 62 fitted around the lower spindle member 52b has upper and lower opposite ends fixed to the ring 59 and the projecting portion 61, respectively.

With the embodiment 2, the disk 11 is pressed against the disk seat 7 without the diaphragm 5 of the embodiment 1, whereas the seal tube 62 covering the portion of the lower spindle member 52b below the ring 59 completely seals the fluid channel 6. Accordingly, the flow control device 51 of the embodiment 2 is also advantageously usable as a sanitary valve.

Embodiment 3

FIGS. 7 to 11 shows this embodiment, i.e.; a flow control device 61. The case 2 has a lower portion, i.e., a case body 2a, internally formed with a single fluid channel 6 having right and left openings. The case body 2a further has a cavity 3 communicating with an intermediate portion of the fluid channel 6. A disk seat 7 is provided at the intermediate portion of the fluid channel 6 at the bottom of the cavity 3. The cavity 3 has an opening peripheral portion which is internally threaded as at 14. A diaphragm 5 is disposed above the disk seat 7 in the bottom of the cavity 3.

Figure 7:
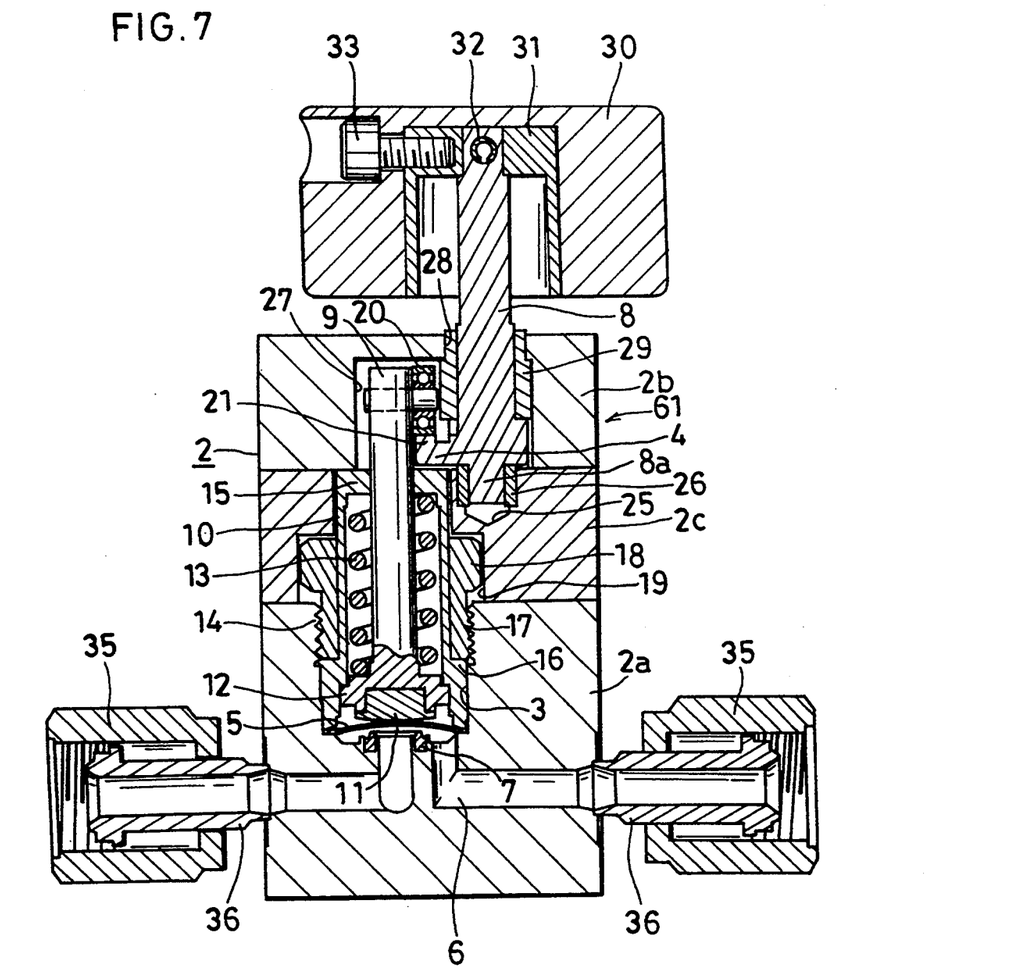
FIG. 7 is a view in vertical section of an embodiment 3 of the invention.

A spindle 9 is vertically disposed in the cavity 3 of the case body 2a and has a disk 11 at the lower end thereof. The disk 11 of the spindle 9 is opposed to the disk seat 7 from above the diaphragm 5. An annular spring retainer 12 is formed at the lower end of the spindle 9.

The case 2 has a rotary shaft 8. The shaft 8 is provided close to its lower end with a rollable member seat 4 horizontally extending from the left half portion of the shaft in FIG. 10 toward the spindle 9 and shaped in a circular-arc form when seen from above. The seat 4 has a rollable member lifting protuberance 21 projecting upward from its upper surface except at opposite ends of the seat. The protuberance 21 is formed in its top with a recess 22 for a rollable member 20 to partially fit in and has slanting guide faces 23, 23 on opposite sides of the recess 22. The rollable member 20, which is mounted on the spindle 9, is disposed on the upper surface of the seat 4 so as to be positioned at the left of the rotary shaft 8.

Figure 9:
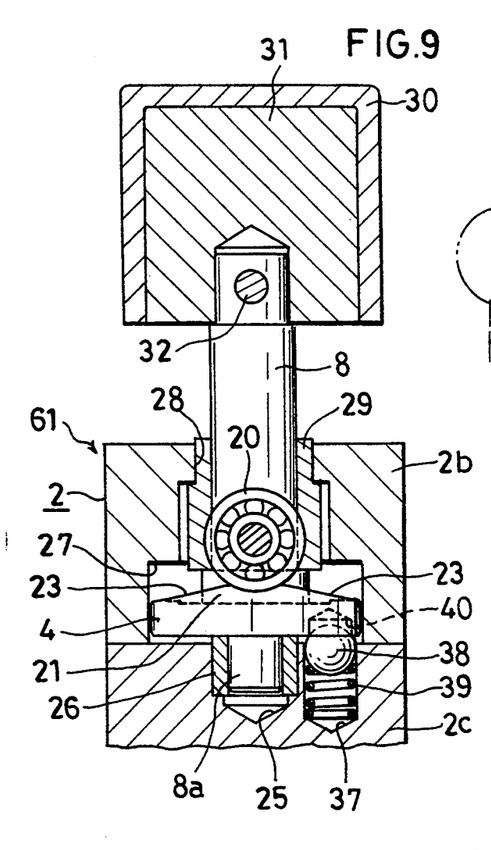
FIG. 9 is an enlarged fragmentary view in vertical section of the embodiment 3 to show a case closure portion.
Figure 10:
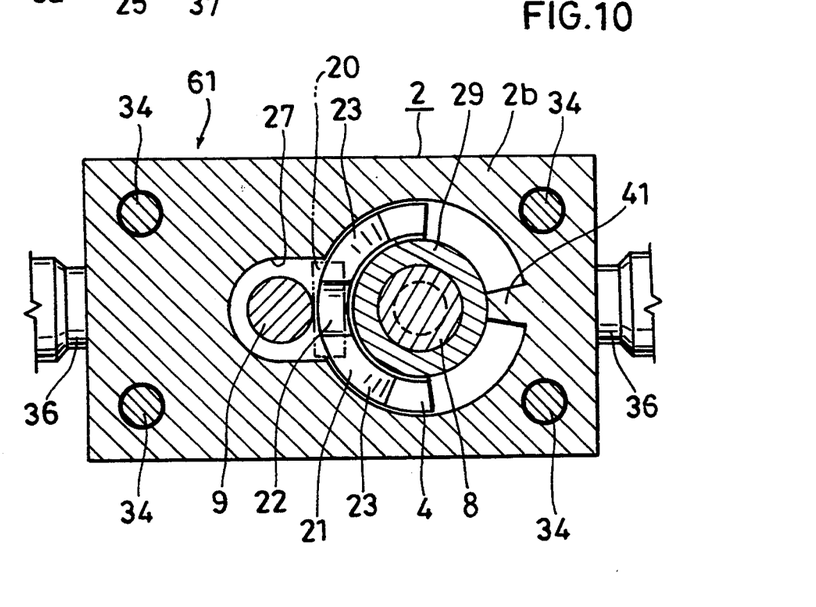
FIG. 10 is an enlarged fragmentary view in horizontal section of the embodiment 3, with a rotary shaft and rollable member shown in phantom lines.

The upper portion of the case 2 is a closure 2b, which has a cavity 27 formed in its bottom side and so sized as to accommodate the lower half portion of the rotary shaft 8, rollable member seat 4, upper end portion of the spindle 9 and rollable member 20 attached thereto. A shaft bore 28 communicating with the cavity 27 vertically extends through a right portion of the closure 2b and has a sleeve 29 fitted therein. The shaft 8 has an upper portion which alone projects upward beyond the closure 2b. The right side portion of the closure 2b opposed to the rotary shaft 8 inside the bottom cavity 27 is formed with a vertical ridge 41 having an approximately trapezoidal cross section for limiting the rotation of the seat 4. When the rollable member seat 4 is rotated by the rotation of the shaft 8, opposite end faces of the seat 4 come into contact with the respective front and rear side faces of the ridge 41.

Figure 8:
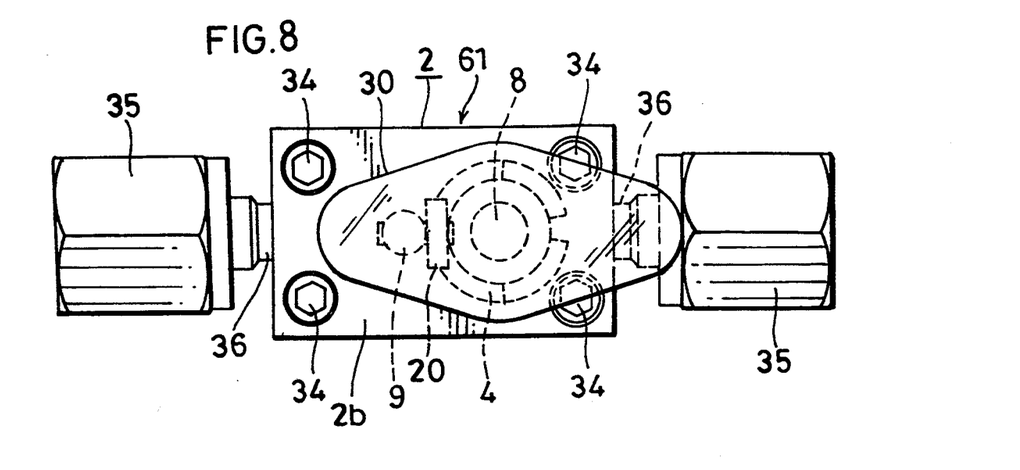
FIG. 8 is a plan view of the same.

The case 2 comprises the closure 2b, an intermediate case portion 2c and the case body 2a, wich are joined together with screws 34 inserted through the four corners of these components. A short piping connection pipe 36 having a union nut 35 is attached to each of the right and left side walls of the base body 2a.

Figure 11:
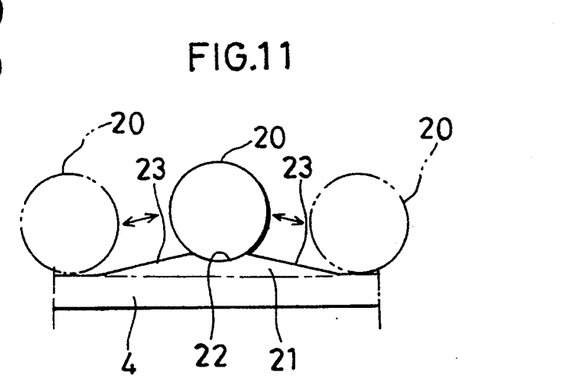
FIG. 11 is a side elevation in development of a rollable member seat of the rotary shaft.

While the fluid channel 6 of the flow control device 61 is held closed, the rollable member 20 at the upper end of the spindle 9 is positioned on either one of opposite end portions of the seat 4 of the rotary shaft 8 as indicated in two-dot-and-dash lines in FIG. 11. At this time, one end face of the seat 4 is in contact with one of the front and rear side faces of the limiting ridge 41 to restrict the range of rotation of the seat 4. This eliminates the likelihood of the rollable member 20 falling off the seat 4.

When the handle 30 and the shaft 8 connected thereto are then rotated clockwise or counterclockwise through a required angle, the protuberance 21 of the seat 4 is moved, causing the rollable member 20 on the seat 4 to ascend the slanting guide face 23 of the protuberance 21 and partly fit into the recess 22 in the top of the protuberance 21. This raises the spindle 9 which is connected to the rollable member 20 against the force of the spring 13 and holds the spindle raised, whereby the disk 11 at the spindle lower end is held away from the disk seat 7 with the diaphragm positioned therebetween to open the fluid channel 6. At this time, a ball-shaped stopper 38 upwardly biased by a coiled spring 39 in the intermediate case portion 2c partially fits into a front indentation 40 in the bottom side of the seat 4, locking the rotary shaft 8 and the handle 30 against rotation.

Thus with the flow control device 61 of the embodiment 3, the fluid channel 6 is closed by the elastic force of the spring 13 instead of tightening up a screw conventionally used, so that no excessive force will act on the disk 11 or the seal face of the disk seat 11. This greatly diminishes abrasion of the seal face, while the handle 30 is unlikely to become displaced when closing the disk owing to an indentation of the seal face due to abrasion or owing to a manufacturing error.

Further especially with the embodiment 3, the rollable member 20 comprises a bearing and is therefore less susceptible to abrasion and usable for a prolonged period. Since the fluid channel 6 is opened by turning the handle 30 in a direction to compress the spring 13, the torque required of the handle 30 is greater in the opening direction. This obviates damage to the diaphragm 5 disposed above the disk seat 7.

The diaphragm 5 provided above the disk seat 7 of the fluid channel 6 within the case 2 completely seals the channel 6. Accordingly, the flow control device 61 is advantageously usable also as a sanitary valve.

Embodiment 4

Figure 12:
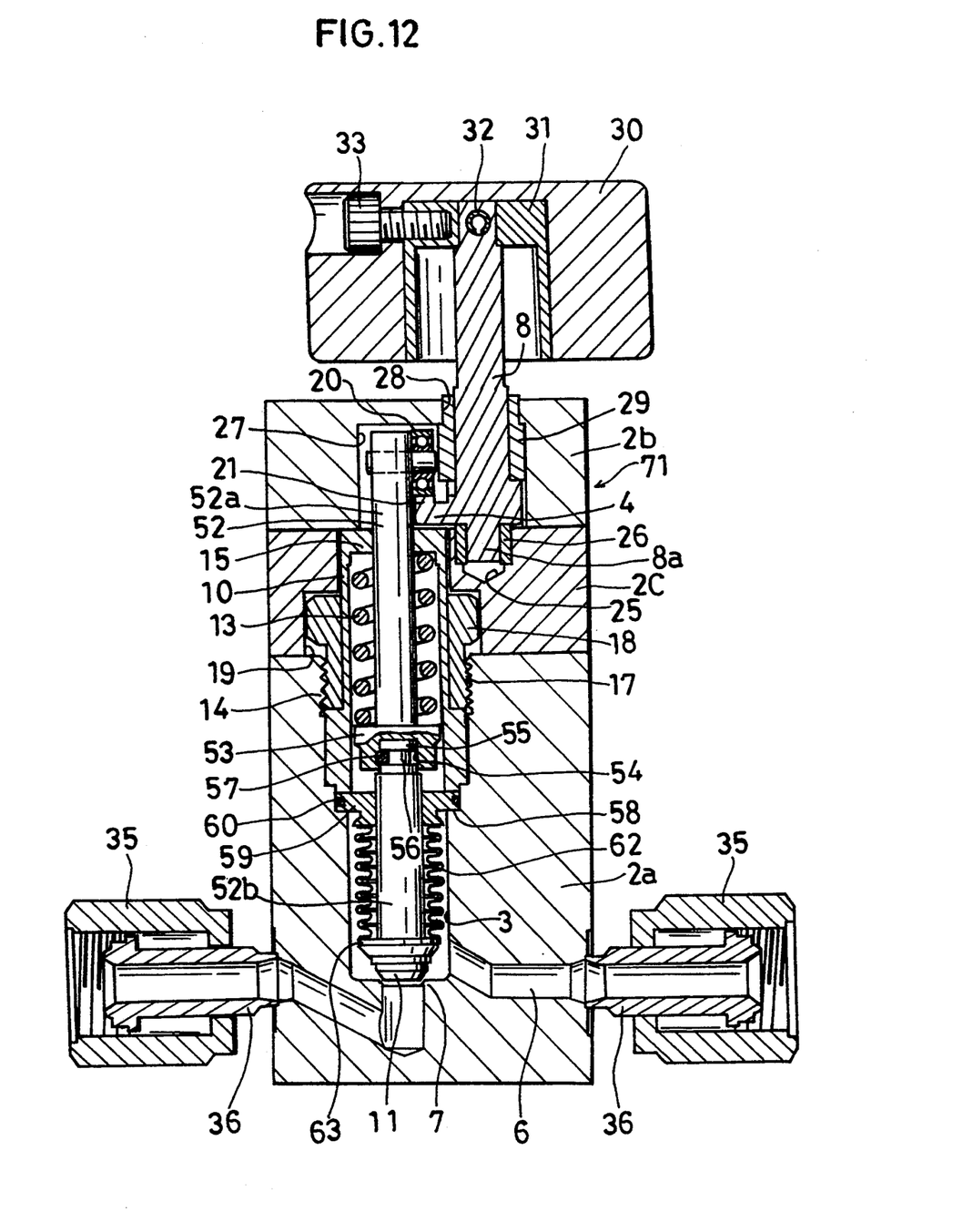
FIG. 12 is a view in vertical section of an embodiment 4 of the invention.

FIG. 12 shows this embodiment, which has nearly the same construction as the flow control device 61 of the embodiment 3 but differs therefrom in that this flow control device indicated at 71 comprises a case body 2a formed as its lower portion and considerably elongated vertically. Accordingly, a cavity 3 of large depth is formed in the case body 2a.

Vertically disposed in the cavity 3 is a spindle 52 which comprises an upper spindle member 52a and a lower spindle member 52b rotatably connected to the lower end of the member 52a and provided with a disk 11 at its lower end. The upper spindle member 52a has an annular spring retainer 53 at its lower end. The spring retainer 53 is formed in the bottom side thereof with a downwardly open insertion recess 54. The lower spindle member 52b has a head 55 inserted in the recess 54 and formed with an annular groove 56. A horizontal connecting pin 57 is partly fitted in the groove 56 and has its opposite ends attached to the spring retainer 53, whereby the lower spindle member 52b is connected to the upper spindle member 52a rotatably relative thereto.

The cavity 3 of the case body 2a is internally provided at the middle of its height with an annular stepped portion 58, to which a ring 59 is fitted with a gasket 60 interposed therebetween. A spring accommodating tube 10 having a top wall 15 is disposed in the cavity 3 above the ring 59. The peripheral edge portion of the ring 59 is held from above by the lower end of the tube 10. Inside the tube 10, a coiled spring 13 fitted around the upper spindle member 52a is provided between the top wall 15 of the tube and the spring retaineer 53. The spring 13 biases the spindle 52 downward, pressing the disk 11 at the spindle lower end into contact with the disk seat 7.

The lower spindle member 52b has an annular projecting portion 63 close to its lower end. A bellows-shaped seal tube 62 fitted around the lower spindle member 52b has upper and lower opposite ends fixed to the ring 59 and the projecting portion 63, respectively.

With the embodiment 4, the seal tube 62 covering the portion of the lower spindle member 52b below the ring 59 completely seals the fluid channel 6. Accordingly, the flow control device 71 of the embodiment 4 is also advantageously usable as a sanitary valve.

Embodiment 5

FIGS. 13 to 16 show this embodiment, i.e., a flow control device 81, which has nearly the same construction as the flow control device 61 of the embodiment 3, i.e., the device 61, except that the case 2 is generally D-shaped when seen from above and has the front and rear corners of its right portion greatly chamfered to a circular-arc form. The device 81 has a rotary shaft 8 which is so short as to be accommodated in a bottom cavity 27 formed in a closure 2b at the upper portion of the case 2. At the right of the bottom cavity 27 of the closure 2b, a sleeve 72 having a bottom is disposed as turned upside down. The rotary shaft 8 has an upper end portion 8b inserted in the sleeve 72. The closure 2b has a right side wall having a window 73 formed in a lower portion of the wall and communicating with the cavity 27.

Figure 13:
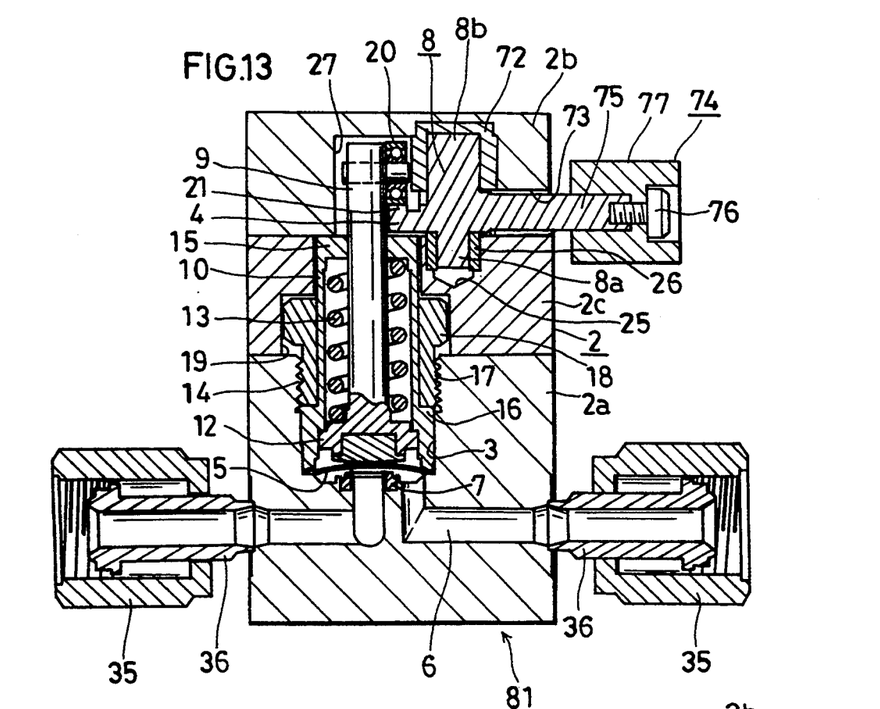
FIG. 13 is a view in vertical section of an embodiment 5 of the invention.
Figures 14, 15:
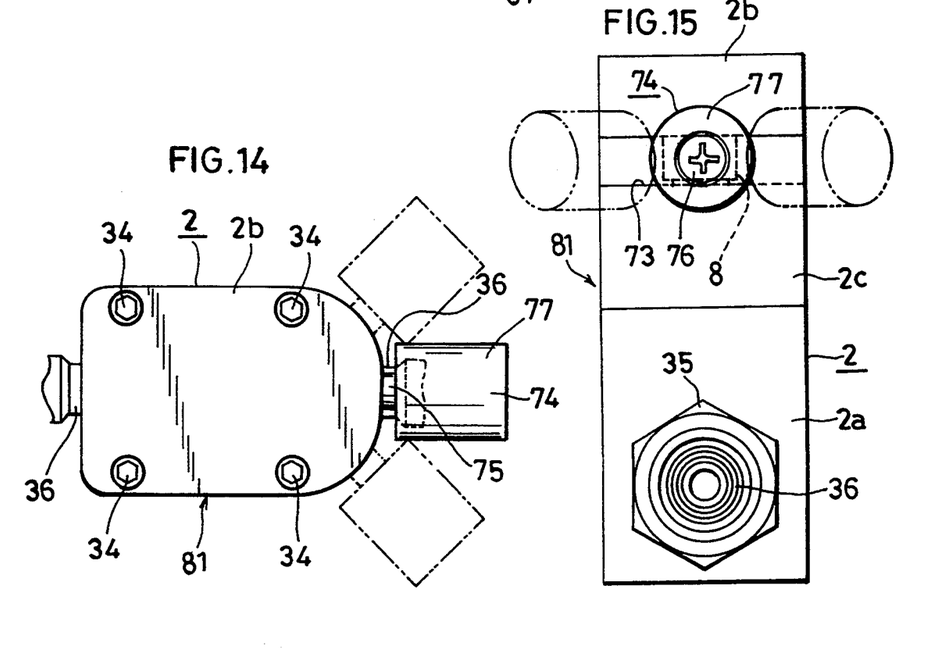
FIG. 14 is a plan view of the same.
FIG. 15 is a right side elevation of the same.

The rotary shaft 8 is formed at an intermediate portion of its length with a rollable member seat 4 horizontally extending radially outward from the left half portion of the shaft and with a lever handle 74 projecting outward toward the right from the right portion of the shaft through the window 73. The lever handle 74 comprises a rodlike lever portion 75, and a handle portion 77 in the form of a horizontal cylinder and fastened to the outer end of the lever portion 75 with a bolt 76.

When the fluid channel 6 of the flow control device 71 is held closed, the rollable member 20 at the upper end of the spindle 9 is positioned on one of flat portions of the rollable member seat 4 of the rotary shaft 8 at opposite sides of the protuberance 21. At this time, the lever handle 74 is in one of the two positions indicated in two-dot-and-dash lines in FIG. 15, with its lever portion 75 bearing against one of the front and rear side faces of the window 73 to restrict the range of rotation of the seat 4. This obviates the likelihood of the rollable member 20 falling off the upper surface of the seat 4.

Figure 16:
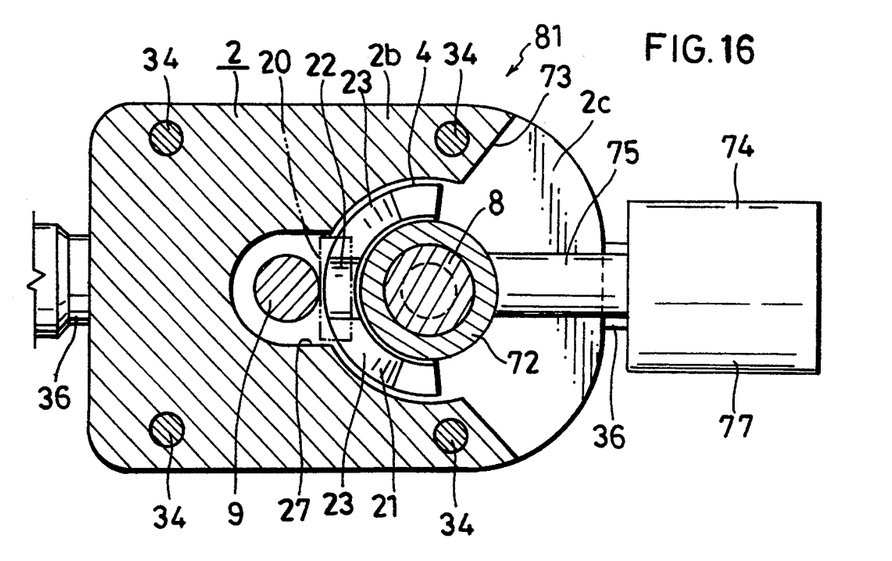
FIG. 16 is an enlarged fragmentary view in horizontal section of the embodiment 5, with a rotary shaft and rollable member shown in phantom lines and a lever handle shown as it is.

When the lever handle 74 in this state is rotated to a position where the lever portion 75 is parallel to the front and rear side walls of the case 2 as indicated in solid lines in FIGS. 15 and 16, the protuberance 21 of the seat 4 is moved, causing the rollable member 20 on the seat 4 to ascend the slanting guide face 23 of the protuberance 20 and partially fit into the recess 22 in the top thereof. Consequently, the spindle 9 connected to the rollable member 20 is lifted against the force of the spring 13 and held lifted, and the disk 11 at the spindle lower end is held away from the disk seat 7 with the diaphragm 5 positioned therebetween to open the fluid channel 6 having the seat 7.

Especially with the embodiment 5, the fluid channel 6 is opened or closed by rotating the rotary shaft 8 with the lever handle 74 integral with the shaft 8, so that the device has the advantage of being easy to manipulate with the handle.

Embodiment 6

Figure 17:
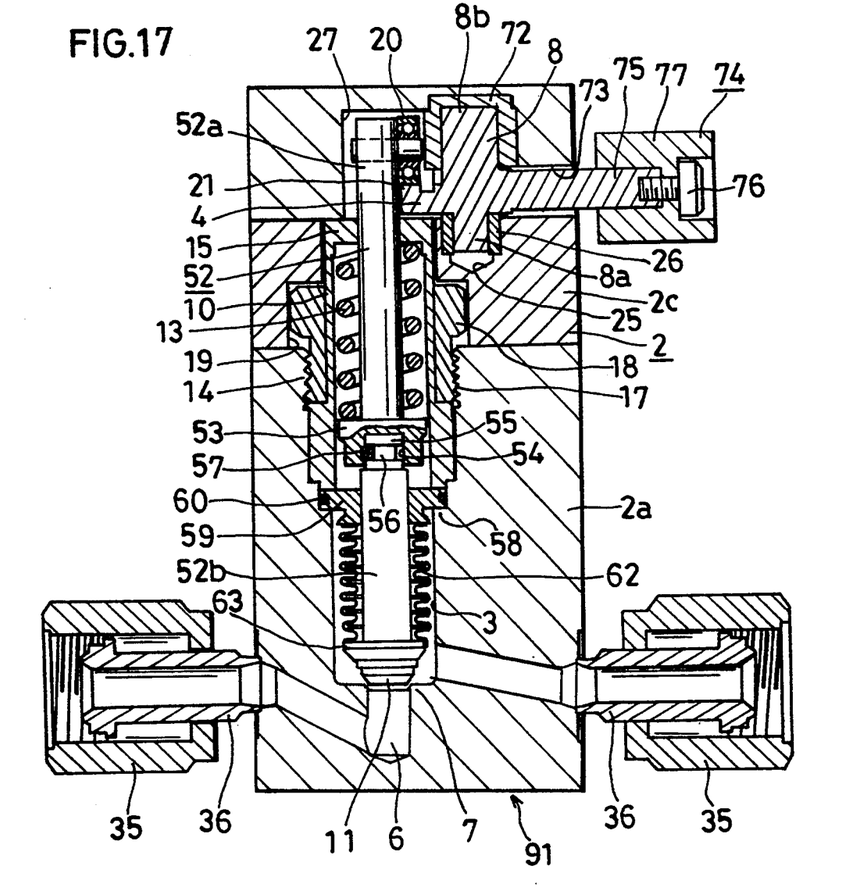
FIG. 17 is a view in vertical section of an embodiment 6 of the invention.

FIG. 17 shows this embodiment, which, as in the case of the device 81 of the embodiment 5, the rotary shaft 8 housed in the case 2 has a lever handle 74. However, the embodiment 6, i.e., flow control device 91, differs from the embodiment 3 in that the lower portion of the case 2, namely, the case body 2a, is considerably elongated vertically. Accordingly, a cavity 3 of large depth is formed in the case body 2a.

Vertically disposed in the cavity 3 is a spindle 52 which comprises an upper spindle member 52a and a lower spindle member 52b rotatably connected to the lower end of the member 52a and provided with a disk 11 at its lower end. The upper spindle member 52a has an annular spring retainer 53 at its lower end. The spring retainer 53 is formed in the bottom side thereof with a downwardly open insertion recess 54. The lower spindle member 52b has a head 55 inserted in the recess 54 and formed with an annular groove 56. A horizontal connecting pin 57 is partly fitted in the groove 56 and has its opposite ends attached to the spring retainer 53, whereby the lower spindle member 52b is connected to the upper spindle member 52a rotatably relative thereto.

The cavity 3 of the case body 2a is internally provided at the middle of its height with an annular stepped portion 58, to which a ring 59 is fitted with a gasket 60 interposed therebetween. A spring accommodating tube 10 having a top wall 15 is disposed in the cavity 3 above the ring 59. The peripheral edge portion of the ring 59 is held from above by the lower end of the tube 10. Inside the tube 10, a coiled spring 13 fitted around the upper spindle member 52a is provided between the top wall 15 of the tube and the spring retainer 53. The spring 13 biases the spindle 52 downward, pressing the disk 11 at the spindle lower end into contact with the disk seat 7.

The lower spindle member 52b has an annular projecting portion 63 close to its lower end. A bellows-shaped seal tube 62 fitted around the lower member 52b has upper and lower ends fixed to the ring 59 and the projecting portion 63, respectively.

What is claimed is:

1. A flow control device, comprising:
   a case formed in a lower portion thereof with a plurality of branch fluid channels for a single main fluid channel and a disk seat at an intermediate portion of each of the branch fluid channels;
   a plurality of spindles housed in the case and each having at a lower end thereof a disk corresponding to the disk seat, each of the spindles being biased by a spring to press the disk against the disk seat;
   a rollable member attached to an upper end portion of each of the spindles for lifting and lowering the spindle; and
   a rotary shaft having a handle and mounted on the case, the rotary shaft having an annular seat for the rollable member,
   a rollable member lifting protuberance projecting upward from an upper surface of the annular seat at a side portion thereof, the protuberance being formed in its top with a recess for the rollable member to partially fit in and having a slanting guide face on each of opposite sides of the recess, each guide face of the protuberance being downwardly slanted from the recess, the rollable member being disposed on the upper surface of the annular seat, the protuberance of the annular seat being movable by rotating the rotary shaft to lift a desired one of the rollable members on the annular seat by the protuberance and to partially fit the lifted rollable member into the top recess of the protuberance, whereby the spindle is lifted to hold the disk away from the corresponding disk seat and to permit the branch fluid channel having the corresponding disk seat to communicate with the main fluid channel, while the other desired rollable member being received on one of the slanted guide faces so as to hold the other disk against the other corresponding disk seat, whereby permitting the other branch fluid channel having the other corresponding disk seat to close communication with the main fluid channel.

2. A flow control device as defined in claim 1, further comprising a diaphragm interposed between the disk at the lower end of each spindle and the disk seat, wherein the spindle has a coiled spring fitted therearound for biasing the disk at the spindle lower end against the disk seat with the diaphragm positioned therebetween.

3. A flow control device as defined in claim 1, wherein each spindle housed in the case comprises an upper spindle member and a lower spindle member rotatably connected to a lower end thereof and provided with the disk at its lower end, the upper spindle member being biased downward by a coiled spring fitted therearound, the lower spindle member having a bellows-shaped seal tube fitted therearound, the seal tube having upper and lower opposite ends fixed respectively to a ring and an annular projecting portion, the ring fixedly resting on an annular stepped portion formed inside the case and positioned below the upper spindle member, the annular projecting portion being formed on the lower spindle member close to a lower end thereof.

4. A flow control device, comprising:
   a case formed in a lower portion thereof with a fluid channel and a disk seat at an intermediate portion of the fluid channel;
   a spindle housed in the case and having at a lower and thereof a disk corresponding to the disk seat, the spindle being biased by a spring to press the disk against the disk seat;
   a rollable member attached to an upper end portion of the spindle for lifting and lowering the spindle; and
   a rotary shaft having a handle and mounted on the case, the rotary shaft being provided with a rollable member seat shaped in a circular-arc form when seen from above,
   a rollable member lifting protuberance projecting upward from an upper surface of the rollable member seat, the protuberance being formed in a top portion thereof with a recess for the rollable member to partially fit in and has a slanting guide face on each of opposite sides of the recess, each guide face of the protuberance being downwardly slanted from the recess, the rollable member being disposed on the upper surface of the rollable member seat, the protuberance of the rollable member seat being movable by rotating the rotary shaft to lift the rollable member on the rollable member seat by the protuberance and to partially fit the rollable member into the top recess of the protuberance, whereby the spindle is lifted to hold the disk away from the disk seat to an open position and when the rollable member is moved to one of the slanted guide faces as the protuberance is rotatably moved in a downward direction allowing the disk to move against the disk seat to a close position.

5. A flow control device as defined in claim 4, wherein a diaphragm is interposed between the disk at the lower end of the spindle and the disk seat, and the spindle has a coiled spring fitted therearound for biasing the disk at the spindle lower end against the disk seat with the diaphragm positioned therebetween.

6. A flow control device as defined in claim 4, wherein the spindle housed in the case comprises an upper spindle member and a lower spindle member rotatably connected to a lower end thereof and provided with the disk at a lower end thereof, the upper spindle member being biased downward by a coiled spring fitted therearound, the lower spindle member having a bellows-shaped seal tube fitted therearound, the seal tube having upper and lower opposite ends fixed respectively to a ring and an annular projecting portion, the ring fixedly resting on an annular stepped portion formed inside the case and positioned below the upper spindle member, the annular projecting portion being formed on the lower spindle member close to its lower end.

7. A flow control device as defined in claim 4, wherein the rotary shaft is housed in the case, and the handle is a lever handle attached to one side of an intermediate portion along a length of the rotary shaft, the case being formed in a side portion thereof with a window for inserting the lever handle therethrough, the lever handle having another end portion projecting outward through the window, the rollable member seat extending from another side of the intermediate portion of a length of the rotary shaft toward the spindle.

* * * * *